TRANSMISSION AND CONTROL SYSTEM

Original Filed March 21, 1966 3 Sheets-Sheet 1

INVENTOR.
Frank Dickenbrock
BY
Robert L. Spencer
ATTORNEY

TRANSMISSION AND CONTROL SYSTEM

Original Filed March 21, 1966 3 Sheets-Sheet 2

INVENTOR.
Frank Dickenbrock
BY
Robert L. Spencer
ATTORNEY

TRANSMISSION AND CONTROL SYSTEM

Original Filed March 21, 1966 3 Sheets-Sheet 3

INVENTOR.
Frank Dickenbrock
BY
Robert L. Spencer
ATTORNEY

United States Patent Office

Re. 26,917
Reissued June 23, 1970

26,917

TRANSMISSION AND CONTROL SYSTEM

Frank Dickenbrock, Warren, Mich., assignor to General Motors Corporation, Detroit, Mich., a corporation of Delaware

Original No. 3,394,617, dated July 30, 1968, Ser. No. 535,824, Mar. 21, 1966. Application for reissue May 6, 1969, Ser. No. 830,893

Int. Cl. F16h *47/08, 15/50, 15/38*

U.S. Cl. 74—730 16 Claims

Matter enclosed in heavy brackets [ ] appears in the original patent but forms no part of this reissue specification; matter printed in italics indicates the additions made by reissue.

ABSTRACT OF THE DISCLOSURE

A roller friction transmission having two friction units and a hydrodynamic torque converter wherein a common input race for both friction units is driven by the converter turbine, wherein the reaction torque of the torque converter and the reaction torque of one friction roller unit are both transmitted to the transmission case through the reaction spider of the other friction unit.

This invention relates to transmissions and more particularly to a friction roller transmission adapted to provide infinitely variable changes of drive ratio, and the control system for controlling the drive transmission drive ratio.

The control system herein disclosed provides a simple roller mount which will allow the roller to be steered to its correct tilt position by low amplitude forces with large tractive forces serving as the primary forces acting to tilt the roller. A small force, only, is necessary to incline the roller and this inclination produces a large tractive force trying to tilt the roller. In addition, the control system automatically reduces the roller inclination to zero when the desired tilt angle is reached. The roller mount, in addition, provides a path for lubrication, limits the rate of ratio change, and prevents undesirable ratio change. The control system is arranged such that the rate of tilt change is proportional to the difference between the desired and actual roller tilt. The control system will correct any tendency of the rollers to overshoot or to wander in tilt. In addition, the control system is unaffected by axial deflections and can be adjusted for both axial and circumferential tolerance errors.

These and other features and advantages of the invention will be apparent from the following specification and claims taken in conjunction with the accompanying drawings in which:

Figure 5A:
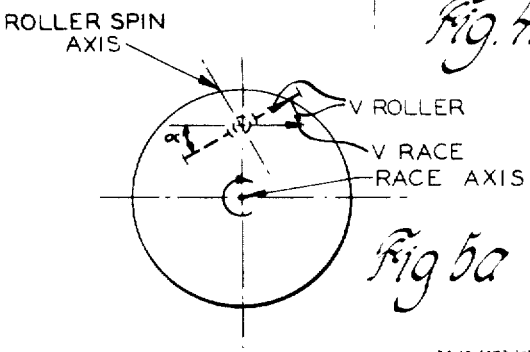
Figure 5:
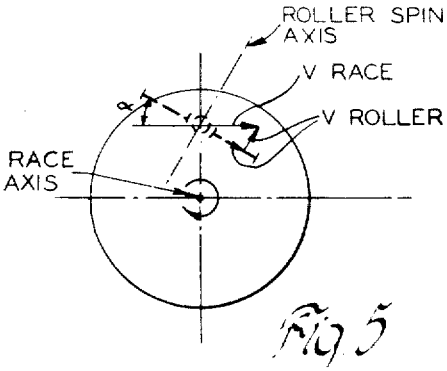

FIGURE 5 is a diagrammatic illustration of an input end view illustrating the roller and race velocities with the roller inclined such that the roller spin axis is inclined with respect to the race axis; and FIGURE 5a is a diagrammatic illustration of an output end viey illustrating the roller and race velocities with the roller inclined such that the roller spin axis is inclined with respect to the race axis.

Figure 3:
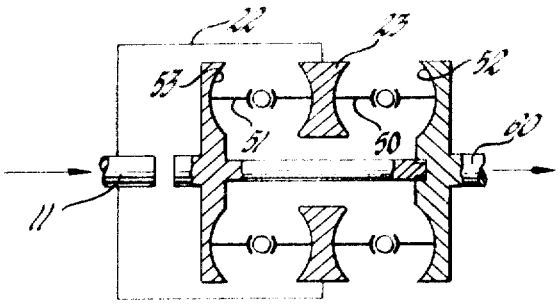
FIGURE 3 is a schematic diagram illustrating the rollers positioned to provide a direct drive or 1:1 drive ratio.

Referring initially to FIGURE 3, there is shown schematically the roller-race feature of a friction transmission having a power input shaft 11 connected to drive a central power input race 23 through a drum 22. Front and rear rollers 51 and 50 contact opposite sides of race 23 and contact driven races 52 and 53 which deliver power to a power delivery shaft 60. In the race position shown, output shaft 60 will be driven at the same speed as input shaft 11 or at a 1:1 drive ratio.

Figure 3A:
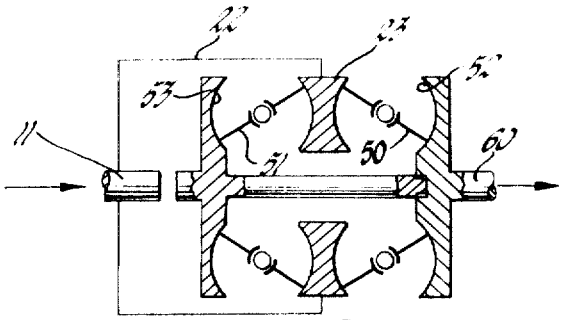
FIGURE 3a is a schematic diagram illustrating the rollers in overdrive or speed multiplying position.
Figure 4C:
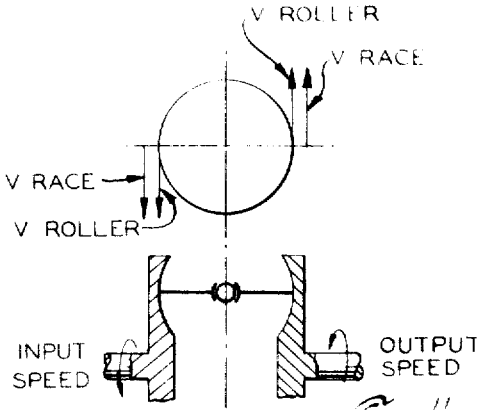
FIGURE 4a is a diagrammatic illustration of a longitudinal view illustrating the roller and race velocities when the roller inclination is zero.
FIGURE 4b is a diagrammatic illustration of an output end view illustrating the roller and race velocities when the roller inclination is zero.

With the rollers positioned as shown in FIGURE 3a output shaft 60 will be driven faster than input race 23 or in overdrive or speed multiplying ratio. The rollers may also be positioned in FIGURE 3b to provide underdrive of shaft 60 or to provide torque multiplying ratio. It will be understood that within the range of operation of the device the rollers may be placed in various positions with respect to the driven races to provide an infinite number of ratios of overdrive or underdrive as well as direct drive of output shaft 60.

Figure 3B:
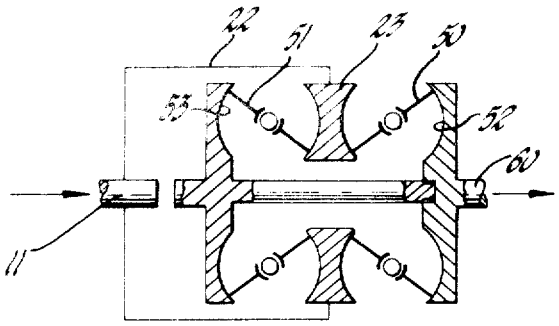
FIGURE 3b is a schematic diagram illustrating the rollers in underdrive or torque multiplying position.

FIGURES 3, 3a, 3b illustrate the rollers in various operative positions *with different tilt angles to provide different ratio drives* but not the method or structure for tilting them to such positions. It is possible to change roller position simply by shoving or forcing them into a desired position. Such a method is undesirable because it requires high forces and has slow response. As distinguished from this method, the rollers may be steered to a tilt angle by use of a relatively minor force.

Figure 4:
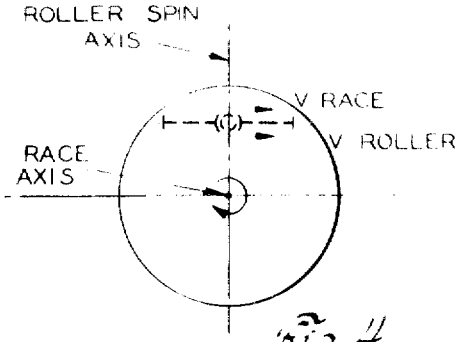
FIGURE 4 is a diagrammatic illustration of an input end view illustrating the roller and race velocities when the roller inclination is zero.
Figure 4B:
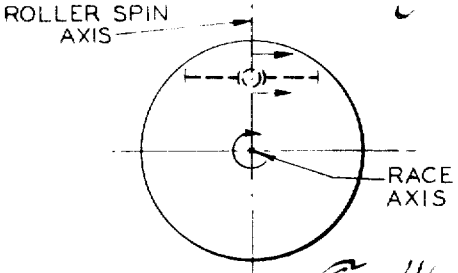

In FIGURES 4, 4a, 4b, the relative [velocity] *velocities* of the races and rollers [is] *are* illustrated for an operating condition wherein the roller are placed in a first of two possible positions. This position is one wherein the spin axis of the roller intersects the race axis at the center of the roller *or midway between the races* and the roller simply spins with no other movement. The roller and race velocities are equal as illustrated by the vectors, for the condition of zero inclination of the rollers with respect to the races.

In FIGURES 5 and 5a the effect of inclining the rollers with respect to the races is illustrated by appropriate vectors V-race, V-roller. As illustrated, the roller spin axis is inclined with respect to the race axis by the angle $\alpha$. The vectors *illustrate* [illustrated] the race and roller velocities for an inclination of a given angle. It can be seen that inclining the roller moves its spin axis away from the race axis. The roller will tend to match the race velocity and will do this by tilting to generate the necessary velocity components. Only a small force is necessary to incline the roller and this inclination produces large tractive forces trying to tilt the roller. The control system hereafter described makes use of the above principle and in addition automatically reduces the roller inclination to zero when the desired tilt angle is reached.

Figure 1:
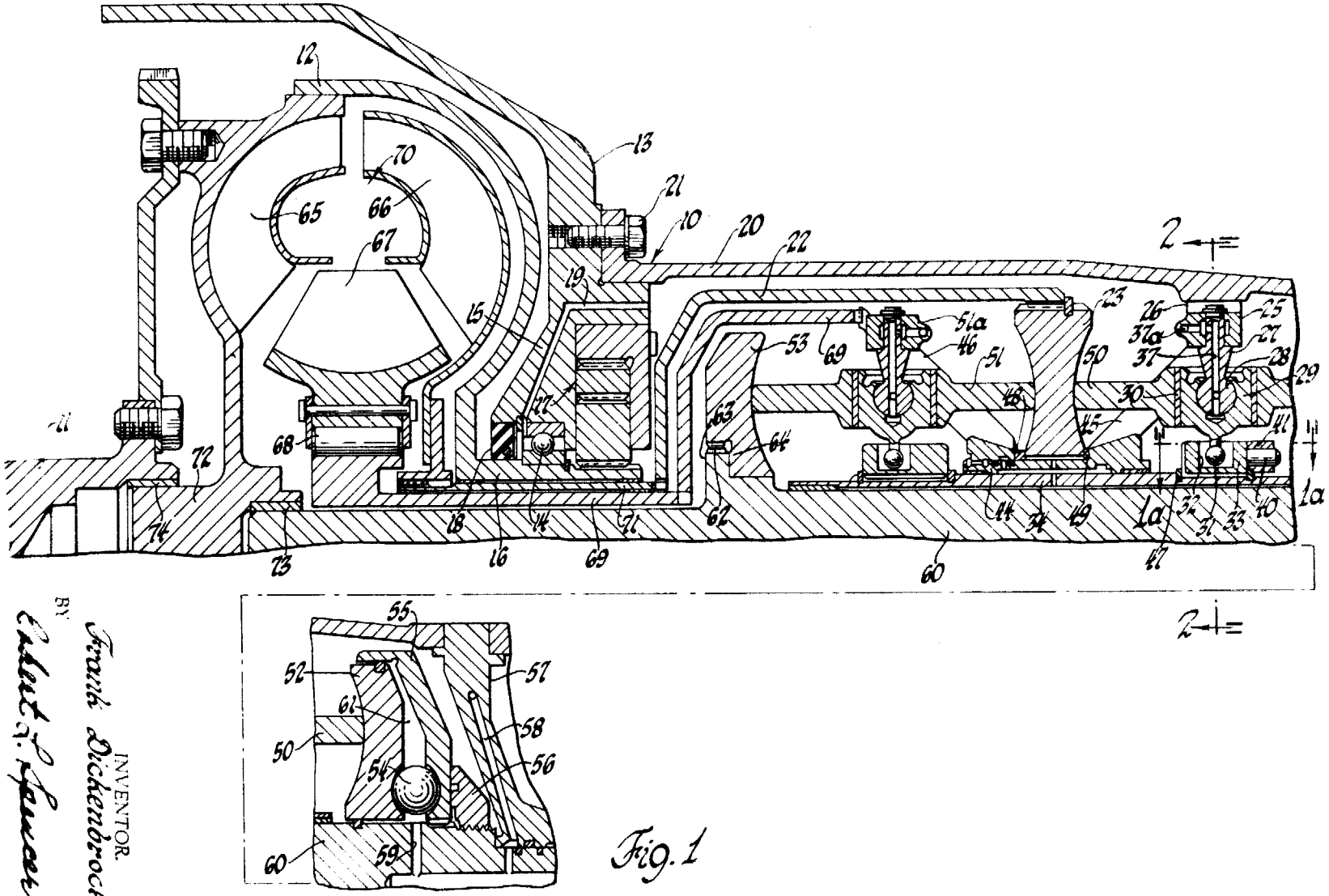
FIGURE 1 is a longitudinal partially sectional view through a transmission incorporating the features of this invention.

Referring to FIGURE 1 there is shown a transmission 10 incorporating a roller control system utilizing initial roller *inclination* [tilt] (a relatively small force) and roller tractive effort (a relatively large force) to change the tilt angle of the rollers to any desired tilt angle.

An engine driven power input shaft 11 drives a drum 12 rotatably supported in a transmission housing 13 by a bearing 14. An axial sleeve 16 supported in bearing 14 drives a pump 17 adapted to provide oil under pressure for transmission control and lubrication purposes. A seal 18 is disposed between web 15 and sleeve 16 and oil return passages 19 are provided in the web. A housing section 20 is bolted to housing 13 by bolts 21. A race drive drum 22 splined to a power input race 23 drives race 23 whenever engine driven power input shaft 11 is rotated.

Figure 2:
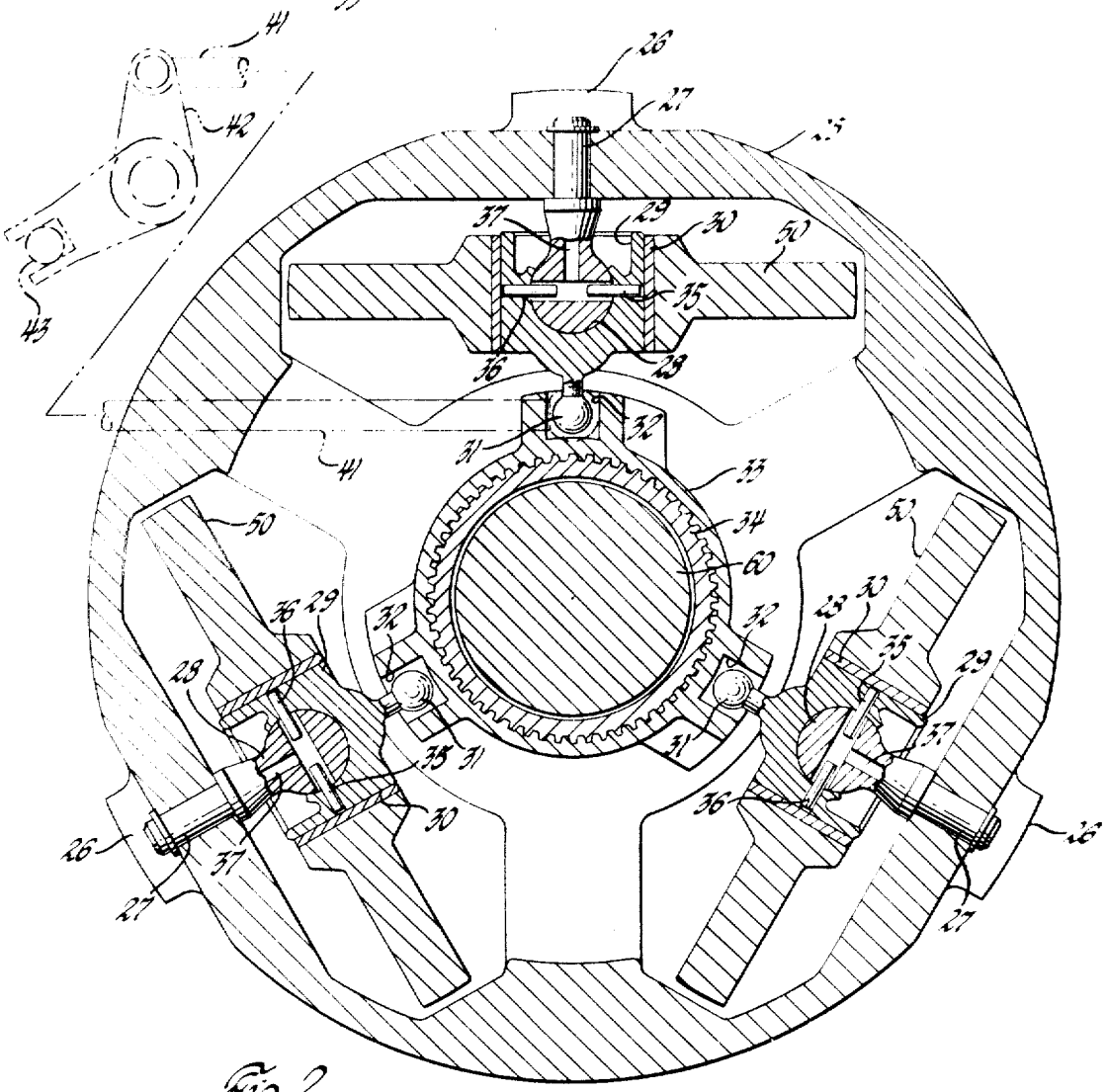
FIGURE 2 is a sectional view through the roller mount and control assembly.

A rear spider 25 shown in FIGURES 1 and 2 is splined to case section 20 and is held against rotation by splines 26 on the spider. Spider 25 comprises a ring in which are supported three masts 27, each mast supporting a roller 50 as best shown in FIGURE 2. Each mast is formed with a ball head 28 for receiving a roller carrier 29. Each roller 50 is rotatably supported on carrier 29 by means of a bushing 30. Each carrier 29 is swaged to ball 28 such that ball 28 serves as a pivot point for the carrier. Carriers 29 are provided with [a] ball-ended [extension] *extensions* 31, the balls 31 each being disposed in a helical groove 32 formed in a roller phasing collar 33 rotatable with central control sleeve 34. Two pins 35 and 36 are driven into the carrier 29. These pins prevent the carrier from spinning and wearing out its ball end, limit the inclination of the carrier [and] *to limit the rate of change of ratio to* prevent too rapid ratio change, and channel lubricating oil into the roller bushing. As shown, oil for lubrication purposes may be supplied to an annular passage 37a in spider 25 and through passage 37 in masts 27 and through passages in pins 35, 36 to bushing 30.

Figure 1A:
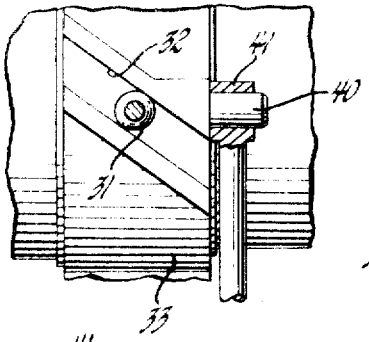
FIGURE 1a is a top plan view of a helical groove provided on a drive ratio control sleeve.

Collar 33 may be formed integrally with control sleeve 34 or may be formed as a separate piece splined to sleeve 34. In either event the member 33 is formed with a stub shaft 40 adapted to receive a control rod 41. Rod 41 may be moved by any suitable means such as a hydraulic [juck] *jack* to rotate control sleeve 34. Helical groove 32 in collar 33 is preferably at a 30° helix angle, as shown in FIGURE 1a. Rod 41 may be moved by means of any suitable linkage such as a movable bellcrank lever 42 actuated by a pin 43.

Power input race 23 is rotatably supported upon a support member 44 grounded to spider 25 by a web 45.

A forward unit roller 51 is supported in a spider 51a and carrier assembly similar to that already described and, accordingly, additional detailed description is not believed necessary. The spider 51a of the forward unit is grounded to race support member 44 by a web extension 46 splined to member 44. Ground member 46 is preferably designed to have inherent flexibility and may comprise a flexible plate. A spacer 47 is disposed between sleeve 34 and one side of member 33 and spacers 48 and 49 are disposed between race 23 and member 44.

Roller 50 contacts power input race 23 and a power delivery race 52 supported upon a power delivery shaft 60. Any suitable axial loading device may be used to place an axial thrust on the rollers and races to maintain the rollers in nonslipping friction contact with the drive and driven races. For example, a ball 54 may act in cam surfaces in race 52 and *in* a flange 55 splined to shaft 60. Flange 55 may be held on shaft 60 by a nut 56. Oil for axial loading purposes may be supplied to the chamber 61 between race 52 and flange 55 by means of a passage 58 in housing support web 57, and a passage 59 in shaft 60.

Roller 51 contacts drive race 23 and delivers power to a driven race 53, connected to shaft 60 by a spline 62, [and] the shaft 60 and race 53 being provided with overlapping lips 63 and 64 which absorb the axial thrust placed on race 53 by the axial thrust loading mechanism.

Drive shaft 11 drives an impeller 65 of a hydrodynamic torque converter having a turbine 66 and a bladed reactor 67, the converter assembly being indicated generally at 70. Reactor 67 is grounded against reverse rotation by means of a one-way brake 68 and a ground sleeve 69 splined *to* spider 51a of the front roller unit. Turbine 66 is splined to a drive sleeve 71 which, in turn, is splined to race drive drum 22. Output shaft 60 is piloted in the hub 72 of impeller 65 while hub 72 is piloted in crankshaft 11. Bushings 73 and 74 are disposed between hub 72 and shaft 60 and between hub 72 and crankshaft 11. Shaft 60 may drive a forward and reverse gear unit (not shown) which in turn may drive the vehicle wheels, not shown.

The features heretofore described, including the arrangement of the control sleeve and helical slot, and ball ends for causing the rollers and carriers to incline is believed novel. The direction of the helical slots is so arranged that as the rollers tilt the slot and ball pin coact to tend to reduce this inclination of the rollers. Tilt of the rollers will continue until this inclination is zero. If any overshoot or wander from a desired tilt position occurs, the carrier ball end will move in the slot or helical groove and produce an inclination tending to automatically return the roller to its desired position. Since the inclining of the roller moves its spin axis away from the race axis as explained in connection with FIGURES 5, 5a, the roller will tend to match the race velocity and will do this to generate the necessary velocity components. The control system therefore also produces a rate of tilt correction *or change* which is variable and is proportional to the difference between the desired and actual tilt position. The rate of tilt correction will be relatively large when the difference between the desired tilt position *and the actual tilt position* is relatively great and will automatically decrease as the roller approaches the desired tilt position, *due to the varying tractive forces generated at the rollers' edges resulting from the progressively varying inclination of the rollers.*

The spacer 47 in FIGURE 1 provides a convenient means for making initial adjustments for manufacturing tolerance errors such that the ratios of the two roller units will be the same. Due to manufacturing tolerance errors in making the carriers and control sleeve mechanism these axial and circumferential tolerances may result in an assembly wherein the ratios of the two roller units are not the same. The spacer 47 may be selected to correct for both of these errors since it shifts the position of the helical grooves. More specifically, the spacer may be selected of proper width to shift the position of the grooves relative to each other to assure that the ratios of the roller units are the same.

As heretofore stated, the front unit spider [25] *51a* which is not rigidly fixed to the case is supported torsionally and axially by a support member 46 which comprises a flex plate. The normal contact load tends to deflect the two roller sections axially. Accordingly, some part must be able to accommodate this deflection to prevent the roller bushings from being excessively loaded. The floating front unit spider [25] *51a* allows movement. Although this movement will tend to shift the front unit carrier ball 31 in its helical groove 32, this can be avoided by designing the necessary torsional flexibility into the front spider [25] *51* and designing the front unit flex plate to have proper stiffness to prevent ratio change due to axial loading.

There has been provided a novel control system incorporating a simple roller mount which will allow the roller to be steered into its correct tilt position by low amplitude forces. This roller mount provides a path for lubrication, limits the rate of ratio change and prevents undesirable carrier spinning. The control system is so constructed that the rate of roller tilt change is variable and proportional to the difference between the desired and actual roller tilt. The control system will automatically correct any tendency of the rollers to wander or overshoot in tilt. The control system is unaffected by axial deflections and can be adjusted for both axial and circumferential tolerance errors to assure that the ratios of both friction units are the same. The torque converter impeller 65 is driven at engine speed and the reaction torque from reaction member 67 is grounded to the case through spider [25a] *51a*, flexible plate 46, support member 44, plate 45, and rear spider 25 to housing *section* 20.

The arrangement whereby the torque converter reaction torque is transmitted to the front unit floating spider and the reaction from the front unit spider are transmitted to the rear unit spider through sleeve 44 and flexible plate connectors 46 and 45 is also believed novel.

I claim:

1. In a transmission, a case, an output shaft, an engine driven power input race for driving first and second roller units, each of said roller units including a power delivery race fixed for rotation as a unit with said output shaft and a disc roller for transmitting torque between said input race and said output [shafts] *shaft*, respectively, each of said units including a reaction spider comprising an annular ring, means grounding the exterior periphery of the spider ring of the first of said units directly to said case, a support member concentric with said output shaft for rotatably supporting said input race, means connecting the reaction spider ring of said second unit to said input race support member, means connecting said input race support member to said first unit spider ring whereby reaction torque of said second unit spider is transmitted to said case through said input race support member and said first unit reaction spider ring, a first mast having a hub carried by said first unit spider ring and a free end extending inwardly from said ring into the space encompassed by said ring, a ball on said free end, a roller carrier forming with said ball a swivel joint and rotatably supporting the disc roller of the first unit in contact with said input race and said first unit power delivery race, a drive ratio control sleeve, a collar on said sleeve, a helical groove in said collar, an extension on said carrier having a free end disposed in said groove, a second mast having a hub carried by said second unit reaction spider ring and a free end extending radially inwardly from said ring into the space encompassed by said ring, a ball on said free end, a second roller carrier supporting a disc roller for the second unit in contact with said power input race and said second unit power delivery race, said second carrier forming a swivel joint with said second mast ball end, a second collar on said sleeve, a helical groove in said second collar, an extension on said second roller carrier having a free end disposed in said groove, and means for rotating said sleeve to tilt the rollers of each of said units relative to said races.

2. In a transmission, a case, a hydrodynamic torque converter including an engine driven impeller, a turbine and a reaction member, a [fritcion] *friction* roller unit including a power input race, a power delivery race and a disc type roller in friction contact with said races, a support member for rotatably supporting said input race, a final power delivery shaft driven by said power delivery race, a reaction spider comprising an annular ring grounded to said case at the outer periphery of said ring, a mast having one end supported in said ring and a free end extending inwardly into the space encompassed by said ring, a ball on said free end of said mast, a carrier rotatably supporting said disc roller, said carrier forming with said mast ball a swivel joint between said mast and said carrier, a ratio control collar, a helical groove in said collar, an extension on said carrier disposed in said groove, said final power delivery shaft extending through said ratio control collar and said input race support member, means for rotating said drive ratio control collar relative to said input race support member to vary the drive ratio, means connecting said power input race to said torque converter turbine including a cylinder member extending from said turbine to said power input race, means for braking said torque converter reaction member from rotation in at least one direction including a second cylinder member disposed inside said first cylinder member and fixed to said input race support member, and means connecting said input race support member to said reaction spider for transmitting reaction torque of said torque converter reaction member to said case through said spider.

3. In a transmission, a case, a hydrodynamic torque converter including an engine driven impeller, a turbine and a reaction member, [a] first and second friction roller units, a first reaction spider for said first roller unit comprising an annular ring secured to said case at the outer periphery of said ring, a mast having a base supported in said ring and extending radially inwardly into the space encompassed by said ring, a ball end on said ring, a roller carrier forming with said ball end a swivel joint, a disc roller rotatably supported upon said carrier, a power input race support member, a power input race rotatably supported upon said support member, a drive ratio control sleeve rotatably supported in said input race support member and extending through said input race support member, a power delivery shaft extending through said drive ratio control sleeve, a power delivery race rotatable as a unit with said power delivery shaft, said disc roller contacting said input race and power delivery race for transmitting torque therebetween, an extension on said roller carrier, a drive ratio control collar fixed for rotation with said sleeve, a helical groove in said collar receiving said carrier extension, a second spider for said second roller unit comprising an annular ring, a mast carried by said second spider ring having a free end extending radially inwardly from said ring into the space encompassed by said ring, a ball end on said mast, a roller carrier forming with said mast a swivel joint, a disc roller rotatably supported on said mast, a second unit power delivery disc rotatable as a unit with said power delivery shaft, said second unit disc roller contacting said input race and second unit power delivery race for transmitting torque therebetween, a second control collar fixed to said sleeve, a helical groove in said second collar, an extension on said second unit roller carrier having a free end disposed in said groove, a cylinder member connecting said turbine to said input race for driving said input race, means for preventing rotation of said torque converter reaction member in at least one direction including a second cylinder connecting said torque converter reaction member to said second roller unit spider, means connecting said second roller unit spider to said input race support member, means connecting said input race support member to said first unit spider whereby the reaction torque of said torque converter reaction member and said second roller unit is transmitted to said case through said first unit spider, and means for rotating said control sleeve relative to said input race support member to simultaneously [titlt] *tilt* both of said carriers on their respective masts to vary the transmission drive ratio.

*4. In a toric transmission including a housing; an input means; an output means; a toroidal power transmission mechanism comprising a friction roller assembly including first and second annular race members and a roller having a circular perimeter and a central axial opening formed therein, said roller being rotatably disposed between and with opposed portions of the perimeter in frictional contact with said first and second race members for rotation about a spin axis perpendicular to the plane of said circular perimeter at its center inclinating about an inclination axis in said plane through said opposed portions from a normal position in which the spin axis intersects the race axis and tilting about a tilting axis at right angles to said inclination axis and in said plane, a support member, one of said members being operatively connected to the input means, another of said members being operatively connected to the output means, and the third of said members being secured to said housing, said support member having a mast supported by said support member having pivot means at the free end extending into and terminating at the center of said central axial opening, a carrier pivotably mounted on said*

*pivot means at the intersection of said spin axis and said plane, located in said central axial opening and rotatably supporting said roller for rotation only about said spin axis, a ratio control collar concentrically located relative to said support member, a cam groove formed in said ratio control collar, a rigid extension formed on said carrier and extending away from said mast into said cam groove, and means for moving said ratio control collar for inclining said extension, carrier and roller about said pivot means and along a transverse plane intermediate the planes of said first and second races, resulting in automatic tilting of said roller, carrier and extension along a plane perpendicular to said intermediate plane for variation of the drive ratio between said input and output means and in automatic reduction of said inclination to zero.*

*5. In a toric transmission; a housing; input means and output means rotatably mounted in said housing; a pair of annular toric race members coaxially mounted on a race axis with facing toric sides; a roller having a circular perimeter located between said race members with opposed portions of the circular perimeter in frictional contact with said facing toric sides of said race members being rotatable about a spin axis perpendicular to the plane of said circular perimeter at the center thereof and biasing said spin axis to a position intersecting said race axis, being inclinable about an axis of inclination through said opposed portions to move said spin axis away from said race axis, being tiltable to tilt said axis of inclination relative to said race axis, and having a central axial opening in said roller; carrier means in said opening having first universal pivot means opening to one side of said roller; a rigid extension rigidly fixed to said carrier means projecting from one side of said carrier means and roller; bearing means between said carrier means and said roller to rotatably mount said roller on said carrier means for rotation only about said spin axis; a support member having second universal pivot means cooperating with said first universal pivot means for universally pivoting movement of said carrier means about the point at the intersection of said spin axis and said plane of the circular perimeter; movable cam means cooperating with said extension operative on a predetermined movement for a predetermined ratio change to move said spin axis away from said race axis to incline said roller to produce tractive forces to tilt the roller to change the ratio drive and automatically operative in response to said inclination to return said spin axis to said race axis to reduce the roller inclination to zero when said predetermined ratio change is made; one member being operatively connected to said input means; a second being operatively connected to said output means and a third being operatively connected to said housing.*

*6. The invention defined in claim 5 and said cam means having a cam angle to provide a rate of tilt change which is proportional to the difference between the actual tilt position and the desired tilt position.*

*7. The invention defined in claim 5 and said first and second universal pivot means having limit means for limiting the inclination of said carrier means and roller member.*

*8. The invention defined in claim 5 and said first and second universal pivot means having antispin means preventing rotation of said carrier means relative to said support member only about said spin axis so all rotary movement of said roller about said spin axis is provided by said bearing means.*

*9. The invention defined in claim 5 and said central axial opening extending completely through said roller; said carrier means being a unitary element located in said opening; said first universal pivot means being a socket open to one side of said element; said rigid extension projecting from the opposite side of said carrier means.*

*10. In a toric transmission including a housing, a toroidal power transmision mechanism comprising a friction roller assembly including first and second annular race members and a roller having a central axial opening formed therein, said roller being rotatably disposed between and with opposed portions of the perimeter in frictional contact with said first and second race members, a support member, one of said members being operatively connected to an input means, another of said members being operatively connected to an output means, and the third of said members being secured to said housing, an outer annular ring, spoke means for securing said outer annular ring to said central support member, a mast having one end thereof supported by said central support member and a free end extending into and terminating at the center of said central axial opening, a carrier pivotably mounted on said free end and in said central axial opening such that said roller may rotate thereon, a ratio control collar concentrically located relative to said annular ring, a cam groove formed in said ratio control coller, an extension formed on said carrier and extending away from said mast into said cam groove, and means for moving said ratio control collar for inclining said extension, carrier and roller about said free end and along a plane intermediate the planes of said first and second race members, resulting in automatic tilting of said roller, carrier and extension along a plane perpendicular to said intermediate plane for variation of the drive ratio between said input and output means and in automatic reduction of said inclination to zero.*

*11. In a toric transmission including a housing, a toroidal power transmission mechanism comprising a friction roller assembly including first and second races and a roller having a central axial opening formed therein, said roller being rotatably disposed between said first and second races, a central spider member, one of said first and second races and said central spider member being operatively connected to an input means, another of said first and second races and said central spider member being operatively connected to an output means, and the third of said first and second races and said central spider member being secured to said housing, an outer annular ring, spoke means for securing said outer annular ring to said central spider member, a mast having one end thereof supported by said central spider member and a free ball-shaped end extending into and terminating at the center of said central axial opening, a carrier pivotably mounted on said ball-shaped end and in said central axial opening such that said roller may rotate thereon, a ratio control coller concentrically located relative to said annular ring, a cam groove formed in said ratio control collar, an extension formed on said carrier and extending away from said mast into said cam groove, and means for moving said ratio control collar for inclining said extension carrier and roller about said ball-shaped end and along a plane intermediate the planes of said first and second races and parallel thereto when said rollers are in a 1:1 output/input speed ratio, resulting in automatic tilting of said roller, carrier and extension along a plane perpendicular to said intermediate plane for variation of the drive ratio between said input and output means and in automatic reduction of said inclination to zero.*

*12. In a toric transmission including a housing, a toroidal power transmission mechanism comprising a friction roller assembly including a power input race, a driven race, and a roller having a central axial opening formed therein, said roller being rotatably disposed between and frictionally engaging said input and driven races, a reaction member including an annular ring grounded to said housing at the outer periphery thereof, a mast having one end thereof supported by said reaction member and a free pivotable end extending into and terminating at the center of said central axial opening, a carrier pivotably mounted on said pivotable end and in said central axial opening such that said roller may rotate thereon, a ratio control collar concentrically located relative to said annular ring, a cam groove formed*

*in said ratio control collar, an extension formed on said carrier and extending away from said mast into said cam groove, and means for moving said ratio control collar for inclining said extension, carrier and roller about said pivotable end and along a plane parallel to and intermediate the planes of rotation of said input and driven races when said rollers are in a 1:1 output/input speed ratio, resulting in automatic tilting of the roller, carrier and extension along a plane perpendicular to said intermediate plane for variation of the drive ratio between said input and driven races and in automatic reduction of said inclination to zero.*

*13. In a toric transmission including a housing, a toroidal variable-ratio power transmission mechanism comprising a friction roller assembly including a toroidal power input race, a toroidal driven race, said input and driven races being disposed coaxially with respect to one another, and a roller rotatably disposed between said input and driven races and frictionally engaging both of said races, a reaction spider including an annular ring grounded to said housing at the outer periphery thereof, a mast having one end supported by said reaction spider and a free end extending into and terminating at the center of said roller, a carrier rotatably mounted on said free end and supporting said roller, a ratio control collar concentrically located within said annular ring, a cam groove formed in said ratio control collar, an extension formed on said carrier and disposed in said cam groove such that a predetermined rotary movement of said collar causes inclination of said carrier, roller and extension about an axis parallel to the common axis of said races, resulting in tilting of said carrier, roller and extension toward one of said races due to the tractive forces generated on the contacting edges of said roller and in automatically reducing the inclination to zero when the desired tilt angle is reached.*

*14. In a transmission having a case and a hydrodynamic torque converter including an engine driven impeller, a turbine and a reaction member, a friction roller unit operatively connected to said torque converter and including a power input race, a power delivery race and a disc type roller in friction contact with said races, a support member for rotatably supporting said input race, a final power delivery shaft operatively connected to said power delivery race, a reaction spider comprising an an annular ring grounded to said case at the outer periphery of said ring, a support mast having one end supported by said reaction spider and a free end extending into the center of said roller, a carrier rotatably supporting said disc roller, said carrier forming with said mast free end a swivel joint between said mast and said carrier, a ratio control collar, a cam groove in said collar, an extension on said carrier disposed in said cam groove, and means for rotating said drive ratio control collar relative to said input race support member to incline said carrier extension, said carrier and said roller between said races, thereby producing tractive forces on the contacting edges of said roller resulting in automatic tilting of said roller in a radial direction along said races to vary the speed ratio.*

*15. In a toric transmission including a housing, a toroidal power transmission mechanism comprising a power input race; a driven race; and a plurality of rollers, each having a central axial opening formed therein, said rollers being rotatably disposed between and frictionally engaging said input and driven races; a reaction member including an annular ring grounded to said housing at the outer periphery thereof; a plurality of masts, each having one end thereof supported by said reaction member and a free ball-shaped end extending into and terminating at the center of one of said plurality of central axial openings; a carrier pivotably mounted on each of said ball-shaped ends in each of said central axial openings such that one of said plurality of rollers is rotatable thereon; a ratio control collar concentrically located relative to said annular ring; a plurality of cam grooves formed in said ratio control collar; an extension formed on each of said carriers and extending away from said masts into said cam grooves, and means for moving said ratio control collar for inclining said extensions, carriers and rollers about said ball-shaped ends and along a plane intermediate the planes of rotation of said input and driven races, resulting in automatic tilting of the rollers, carriers and extensions along a plane perpendicular to said intermediate plane for variation of the drive ratio between said input and driven races and in automatic reduction of said inclination to zero, the tilting continuing until all the inclination is removed.*

*16. In a toric transmission including a housing; a toroidal continuously variable-ratio power transmission mechanism comprising a toroidal power input race; a toroidal driven race, said input and driven races being disposed coaxially with respect to one another; three rollers, each rotatably disposed between said input and driven races and frictionally engaging both of said races; a reaction spider including an annular ring grounded to said housing at the outer periphery thereof; three masts, each having one end supported by said reaction spider and a free end extending into and terminating at the center of one of said rollers; a carrier rotatably mounted on each of said free ends of said masts and supporting one of said rollers; a ratio control collar concentrically located within said annular ring; a cam groove formed in said ratio control collar in radial alignment with each of said masts; an extension formed on each of said carriers and disposed in one of said cam grooves such that a predetermined movement of said collar causes inclination of each of said carriers, rollers and extensions about an axis parallel to the common axis of said races when said rollers are in a 1:1 speed ratio position, resulting in tilting of each of said carriers, rollers and extensions toward one of said races and in automatically reducing the inclination to zero.*

References Cited

The following references, cited by the Examiner, are of record in the patented file of this patent or the original patent.

UNITED STATES PATENTS

| | | | |
|---|---|---|---|
| 1,947,044 | 2/1934 | Goue | 74—796 |
| 1,985,110 | 12/1934 | Sharpe | 74—200 |
| 2,108,082 | 2/1938 | Sharpe | 74—796 |
| 2,113,638 | 4/1938 | Almen | 74—200 |
| 2,131,158 | 9/1938 | Almen et al. | 74—190.5 |
| 2,182,458 | 12/1939 | Vickers | 74—200 |
| 2,283,759 | 5/1942 | Pollard | 74—691 |
| 2,660,073 | 11/1953 | Patin | 74—200 XR |
| 3,277,746 | 10/1966 | Forster et al. | 74—730 |
| 3,293,945 | 12/1966 | Stockton | 74—796 |
| 3,406,597 | 10/1968 | Perry et al. | 74—865 |

FOREIGN PATENTS

| | | |
|---|---|---|
| 450,246 | 7/1936 | Great Britain. |

LEONARD H. GERIN, Primary Examiner

U.S. Cl. X.R.

74—200, 796